J. L. Booth.
Grain Winnower.
No. 1354. Reissued Nov. 18, 1862.
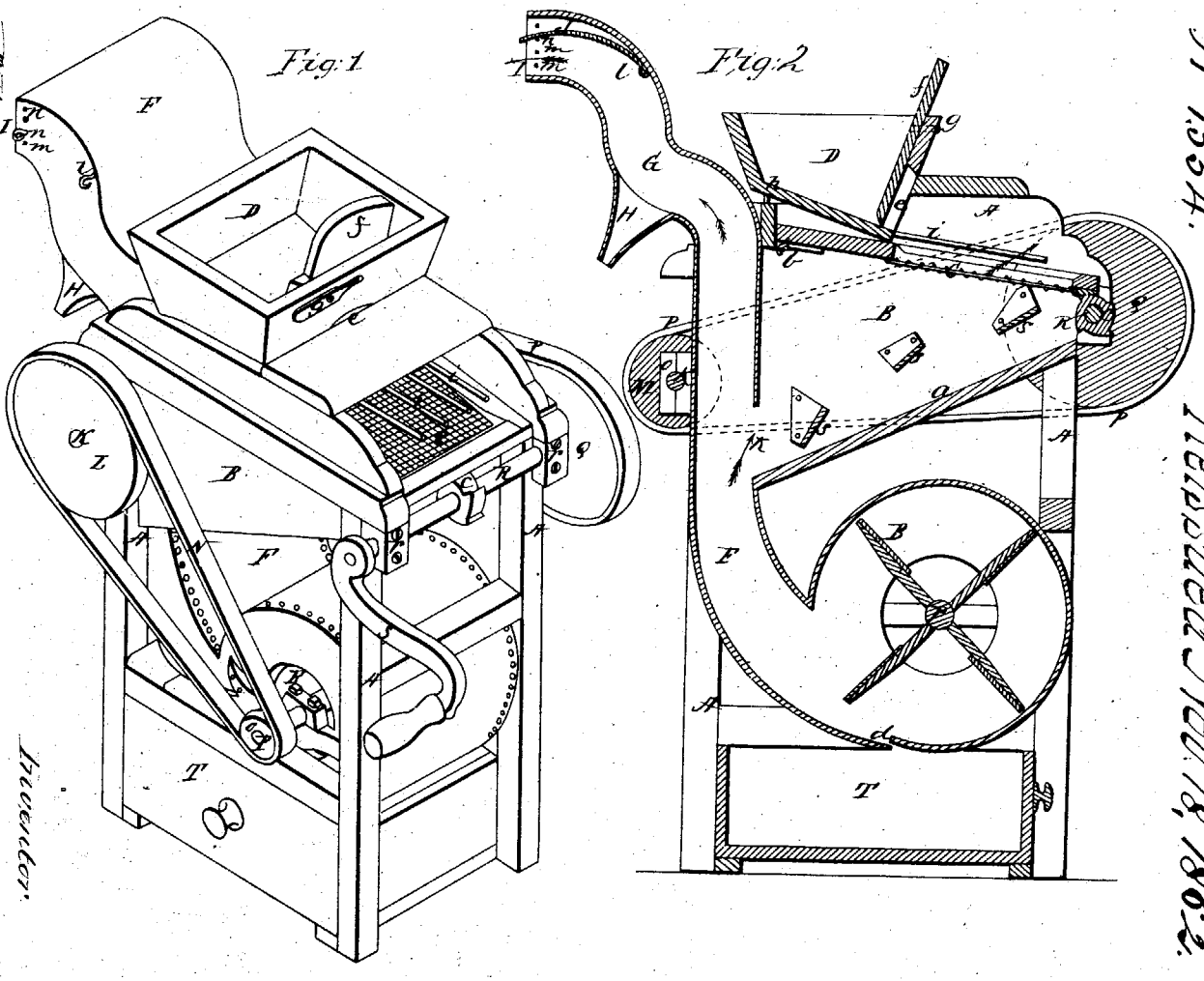
Witnesses
R. T. Asgood.
D. C. Johnson
Inventor.
J. L. Booth.
By J. Fraser, Attorney

UNITED STATES PATENT OFFICE.

JONATHAN L. BOOTH, OF ROCHESTER, NEW YORK

IMPROVEMENT IN GRAIN-SEPARATORS.

Specification forming part of Letters Patent No. 8,033, dated April 8, 1851; Reissue No. 1,354, dated November 18, [illegible]

*To all whom it may concern:*

Be it known that I, JONATHAN L. BOOTH, formerly of Cuyahoga Falls, in the county of Summit and State of Ohio, now of Rochester, in the county of Monroe, State of New York, have invented a new and Improved Vertical-Blast Grain-Separator; and I do hereby declare that the following is a full and exact description thereof, reference being had to the accompanying drawings, making part of this specification—

Figure 1 being a view in perspective of the improved grain-separator; Fig. 2, a central longitudinal vertical section thereof.

Like letters designate corresponding parts in both figures.

The nature of my invention consists in the combination of a vertical upward blast with a shaking sieve with an inclined feeding-board between the sieve and the blast-tube, and in the special features of the application of the blast in this connection, substantially as herein specified.

In some particulars the construction of this improved grain-separator does not differ essentially from that of an ordinary winnowing-machine. Thus, the frame A may be nearly of the ordinary size and shape, and its hopper D presents nothing peculiar. The hopper is generally provided with a gate, *f*, controlled by a lever, *g*, or otherwise, to vary the size of the feeding-aperture *e* for regulating the passage of the grain into the machine. It has also a shaking-sieve, C, for chaffing and removing foreign substances from the grain, and this sieve may either be mounted in a shoe for the purpose, or the shaking motion may be communicated to it direct, as shown in the drawings, wherein the upper side is represented as supported on pivot-pins *b b*, and its lower edge as resting on a cam, *c*, which receives rotary motion from its shaft R. The lower edge of hopper D may rest on the chaffing-sieve, while its upper edge rests on pins *h h*, as shown, so that a moderate vibratory motion may be communicated to the hopper at the same time with the sieve, to assist and regulate the feeding of the grain therefrom. Any other suitable arrangement of the hopper and chaffing-sieve may be employed. Parallel fingers *i i* may extend down over the chaffing-sieve from the bottom of the hopper, a little distance above said sieve, to keep the coarse chaff, heads, and straw from clogging the sieve too much. The fan B, by which the blast is produced, may not differ from the ordinary fan; but it is most conveniently and compactly located directly beneath the chaffing-sieve. From this fan a blast-tube, F, extends upward vertically, or nearly so, in that part which passes by the aperture *k*, through which the grain is delivered, to be subjected to the action of the blast. Intermediate between the hopper or chaffing-sieve and the blast-tube F there is an inclined delivering or feeding board, *a*, or its equivalent, of about the inclination shown, or such as may be found to be most desirable for the purpose of delivering the grain from the chaffing-sieve to the blast-tube in the proper manner and with the proper force or velocity to meet the upward blast without being driven back thereby. If the required strength of blast should be too great for the free passage of the grain over the delivery-board *a* when at a convenient inclination, transverse plates *s s s* (Fig. 1, are added in the delivery-space, so situated and inclined, substantially as shown, as to deflect a considerable portion of the blast passing up through the aperture *k* away from the feeding-board *a*. The grain is thus delivered to the blast-tube, as from a spout, with a certain downward projectile force, and the blast meets it in entirely open space, so that there is nothing to impede the complete separation of the impurities and light grain from the sound, heavy grain, the former being carried upward with the blast, and the latter descending against the blast to a suitable outlet, *d*, which delivers it into a receptacle, T.

The operation is rendered very effective from the grain being long subjected to the force of the concentrated blast while falling through the considerable space from the point of induction at K to that of its egress from the blast-tube. The blast-tube F continues nearly vertically upward some distance beyond the aperture *k*, then it has a turn or bend nearly approaching a horizontal direction, and again quickly another turn or bend toward a vertical direction. At the bottom of this double bend G a narrow discharging-spout, H, opens from the blast-tube.

As the blast ascends with the light grain, and still lighter impurities, the sudden enlargement of the blast-tube at H diminishes the force of the blast, and this, by giving the heavier substance a turn downward, together with the shape of the blast-tube at the double bend G, directs the remaining grain down through the spout H, a small portion of the blast passing out with it, while the chaff and other light impurities continue upward with the main portion of the blast. If all the grain worth saving is not separated by the first double bend G and spout H, another or any required number of bends and spouts may be added.

In the outlet I of the blast-tube F there is situated a valve, J, so arranged as to close more or less of the space by means of a rod, *n*, and adjusting-holes *m m*, or otherwise. The object of this is to regulate the strength of the blast, or to control the relative amount which passes through the chaffing-sieve C and blast-tube, as a portion naturally passes through said sieve, and is useful there in separating the main portion of the chaff from the grain; but a valve, J, located at the outlet of the blast-tube is not absolutely necessary for the purpose. Other equivalent arrangements may be employed, and even the regulation of the blast may be dispensed with without much impairing its efficiency.

A crank, S, or other means of applying power, first gives motion to the shaft R for shaking the sieve and hopper, thence from a pulley, Q, on said shaft a band, P, passes to a multiplying shaft, K, and from a pulley, L, another band, N, passes to a pulley, *o*, on the shaft of the fan B, thereby communicating the required rapid speed to said fan; or any other suitable means of producing the necessary motion may be employed.

In this arrangement I use a pressure-blast, in contradistinction to an exhaust-blast, or rather "draft," as it is more properly termed. There are several advantages in the use of the pressure-blast: First, it does not require the blast-tube to be tightly closed at all points between the entrance and outlet; second, it does not require the impurities to pass through the fan. Then, it permits the blast tube to be opened, and a portion of the blast diverted for the purpose of chaffing before the introduction of the grain to the main tube, and, also, it allows the inferior wheat to be continually discharged through an open spout, H; but a draft or suction-blast may be used when the machine is not employed for chaffing, with a similar though not with nearly as efficient results as are obtained by the direct or pressure blast.

The advantage of the employment of a shaking or chaffing sieve in combination with a vertical upward blast is obvious. The unchaffed grain may be put into the machine at once, and the blast, notwithstanding, is not incumbered by the great mass of chaff.

The advantage of the inclined feeding-board, so as to deliver the grain to the blast without a separating or holding sieve in free space, is also obvious.

What I claim as my invention, and desire to secure by Letters Patent, is—

1. The combination of a vertical upward blast with a shaking or chaffing sieve which receives a divided portion of the blast, substantially as and for the purposes herein specified.

2. The combination of the double bend (or bend) G in the blast-tube and the open spout (or spouts) H, for the purpose specified.

3. A valve, J, or its equivalent, in combination with a vertical upward separating-blast and chaffing-sieve, which receives a divided portion of the blast, for the purpose specified.

JONATHAN L. BOOTH.

Witnesses:
D. C. JOHNSON,
J. FRASER.